US012673708B2

(12) United States Patent
Austin et al.

(10) Patent No.: US 12,673,708 B2
(45) Date of Patent: Jul. 7, 2026

(54) GROUND SENSING UTILIZING ACTIVE SOURCES

(71) Applicant: FOCUS SENSORS LIMITED, Southampton (GB)

(72) Inventors: Edward Austin, Southampton (GB); Toby Fisher, Southampton (GB); Stephen Desbruslais, Southampton (GB); Kit Chambers, Cornwall (GB)

(73) Assignee: Focus Sensors Limited, Southhampton (GB)

( * ) Notice: Subject to any disclaimer, the term of this patent is extended or adjusted under 35 U.S.C. 154(b) by 247 days.

(21) Appl. No.: 18/275,607

(22) PCT Filed: Jan. 28, 2022

(86) PCT No.: PCT/EP2022/052133
§ 371 (c)(1),
(2) Date: Aug. 2, 2023

(87) PCT Pub. No.: WO2022/167348
PCT Pub. Date: Aug. 11, 2022

(65) Prior Publication Data
US 2024/0308557 A1 Sep. 19, 2024

(30) Foreign Application Priority Data
Feb. 2, 2021 (GB) ...................................... 2101436

(51) Int. Cl.
B61L 23/04 (2006.01)
G01L 1/24 (2006.01)

(52) U.S. Cl.
CPC ............ B61L 23/047 (2013.01); G01L 1/242 (2013.01)

(58) Field of Classification Search
CPC ...... B61L 23/047; B61L 23/048; G01L 1/242; G01H 9/004; G01D 5/353; H04B 10/25
See application file for complete search history.

(56) References Cited

U.S. PATENT DOCUMENTS

| | | | | |
|---|---|---|---|---|
| 7,777,496 B2 * | 8/2010 | Evans | ..................... | G01N 21/84 |
| | | | | 324/642 |
| 8,144,333 B2 * | 3/2012 | Huffman | .............. | G01M 11/083 |
| | | | | 356/519 |
| 9,304,017 B2 * | 4/2016 | Handerek | .......... | G01M 11/3127 |
| 9,561,812 B2 * | 2/2017 | Godfrey | .............. | G01M 5/0033 |
| 9,631,972 B2 * | 4/2017 | Hill | ......................... | G01H 9/004 |
| 10,377,397 B2 * | 8/2019 | Kelley | ................... | G01H 9/004 |
| 10,378,928 B2 * | 8/2019 | Zaoui | ................. | G01D 5/35361 |
| 10,444,095 B2 * | 10/2019 | Glueck | ................... | B61L 23/04 |
| 10,697,824 B2 * | 6/2020 | Cedilnik | ............... | G01H 9/004 |
| 10,864,930 B2 * | 12/2020 | Bilodeau | ............... | G01B 17/04 |
| 10,935,398 B2 * | 3/2021 | Austin | ................... | G01H 9/004 |
| 11,130,510 B2 * | 9/2021 | Esprey | ................... | G01H 9/004 |

(Continued)

*Primary Examiner* — Freddie Kirkland, III
(74) *Attorney, Agent, or Firm* — Clark Hill PLC

(57) ABSTRACT

Apparatus and methods for determining ground stability measurements utilizing active sources are disclosed. In one example implementation, a distributed optical sensor detects strains along a length of a railway line. Here, for example, one or more trains provide active sources. The static strain before and after passage of the active source is utilized to determine ground stability. According to other aspects, measurements may be normalized based on characteristics of the active source.

20 Claims, 7 Drawing Sheets

(56) References Cited

U.S. PATENT DOCUMENTS

| | | | |
|---|---|---|---|
| 11,698,289 B2 * | 7/2023 | Hu | G01H 9/004 |
| | | | 73/653 |
| 2015/0013465 A1 * | 1/2015 | Godfrey | B61L 23/045 |
| | | | 73/655 |
| 2018/0180451 A1 * | 6/2018 | Wissem | G01D 5/35387 |
| 2018/0259385 A1 * | 9/2018 | Cedilnik | G01H 9/004 |
| 2019/0225250 A1 * | 7/2019 | Esprey | B61L 1/06 |

* cited by examiner

GROUND SENSING UTILIZING ACTIVE SOURCES

CROSS-REFERENCE TO RELATED APPLICATION(S) INFORMATION

This is a 371 U.S. National Stage application of PCT International application No. PCT/EP2022/052133, filed Jan. 28, 2022, published as WO2022/167348A1, on Aug. 11, 2022, and which claims benefit of and priority to GB patent application No. 2101436.0, filed Feb. 2, 2021, published as GB2603205A, on Aug. 3, 2022, all of which are incorporated herein by reference in entirety.

BACKGROUND

This disclosure relates to optical sensors, and in particular distributed acoustic sensing utilising fibre-optic based sensors. The following disclosure has a particular focus on determining ground stability utilising an active source which is detected using such a sensor.

Optical fibre based sensors are known for detecting various parameters, including acoustic signals, via changes in strain in the fibre. Distributed optical sensors do not have a predefined sensor position, but use analysis of returned signals to infer phase changes along the length of the fibre and hence detect properties of the fibre which affect those returned signals. For example, Rayleigh backscatter may be used as the returned signal.

FIG. 1 shows a schematic diagram of a conventional distributed optical sensor commonly known as a Distributed Acoustic Sensor (DAS). An interrogator launches a probe light pulse 11 into a first end of a measurement fibre 12. The measurement fibre 12 is laid in the area in which sensing is required. An advantage of optical sensors, due to the low loss of optical fibre, is the ability to displace the interrogator from the sensing location. There may therefore be a significant length of measurement fibre 12 providing a lead-in from the interrogator to the measurement region.

As the pulse 11 propagates through the optical fibre a portion of the light is scattered by scattering sites in the optical fibre. Part of that scattered light is captured by the numerical aperture of the optical fibre and propagates back towards the interrogator 10. The main scattering mechanism of interest is Rayleigh scattering which results in backscatter at the same frequency as the propagating light due to elastic collisions with scattering sites ("scatterers").

At the interrogator a backscatter pulse 14 is received. The time of arrival at the interrogator is proportional to the roundtrip distance from the interrogator to a point along the fibre. The pulse decays over time due to losses increasing as distance increases. By sampling the returning pulse 14 at particular times, the backscatter from particular locations along the fibre can be determined. Disturbance of the optical fibre affects its physical structure (at the microscopic level), and hence affects the backscatter pulse 14. Such changes can be used to infer the signal disturbing the fibre.

FIG. 2 shows a schematic diagram of a typical interrogator 10. Transmitter 20 emits probe pulses, and receiver 21 comprises an optical sensor and sampling system for detecting the backscatter pulses. Optical circulator 22 couples the probe pulses from the transmitter 20 into the measurement fibre 12 and couples returning backscatter pulses to the receiver 21.

An exemplary optical sensor is described in PCT Application No. PCT/EP2018/050793 published as WO2018/134137.

Conventionally optical sensors are utilised in a passive manner to detect signals without knowledge of the source of a signal. However, if the occurrence of detectable signals can be predicted information about the source of the signal may be correlated to the detected signals to ascertain additional information from the sensor.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

There is provided a method of determining ground stability utilising a distributed optical sensor, the method comprising the steps of determining a first static strain at at least one location along the length of the distributed optical sensor; detecting variation in strain at the at least one location caused by an active source; determining a second static strain at the at least one location after the variation in strain caused by the active source has ended; and determining the difference between the first and second static strains.

The detection of variation in strain may be performed by detecting higher frequency variations in strain at the location.

The relative strength of the active source may be determined based on higher frequency variations in strain.

The method may further comprise normalising the difference between first and second static strains based on strength of the active source.

The method may further comprise determining an indication of ground stability at the location based on the difference between first and second strains.

The indication of ground stability may also be based on a plurality of differences between first and second strains.

The active source may be a train and the distributed optical sensor is associated with train tracks on which the train runs.

The method may further comprise performing the method at a plurality of locations along the length of the distributed optical sensor.

The method may comprise averaging measurements from the plurality of locations.

There is also provided an optical sensing system for determining ground stability, the system comprising an optical fibre, and an interrogator optically connected to the optical fibre and configured to transmit an optical signal into the optical fibre and to detect returning optical signals output from the optical fibre, wherein the interrogator is configured to perform the methods described herein.

BRIEF DESCRIPTION OF THE DRAWINGS

Embodiments of the invention will be described, by way of example, with reference to the following drawings, in which.

DETAILED DESCRIPTION

Figure 1:
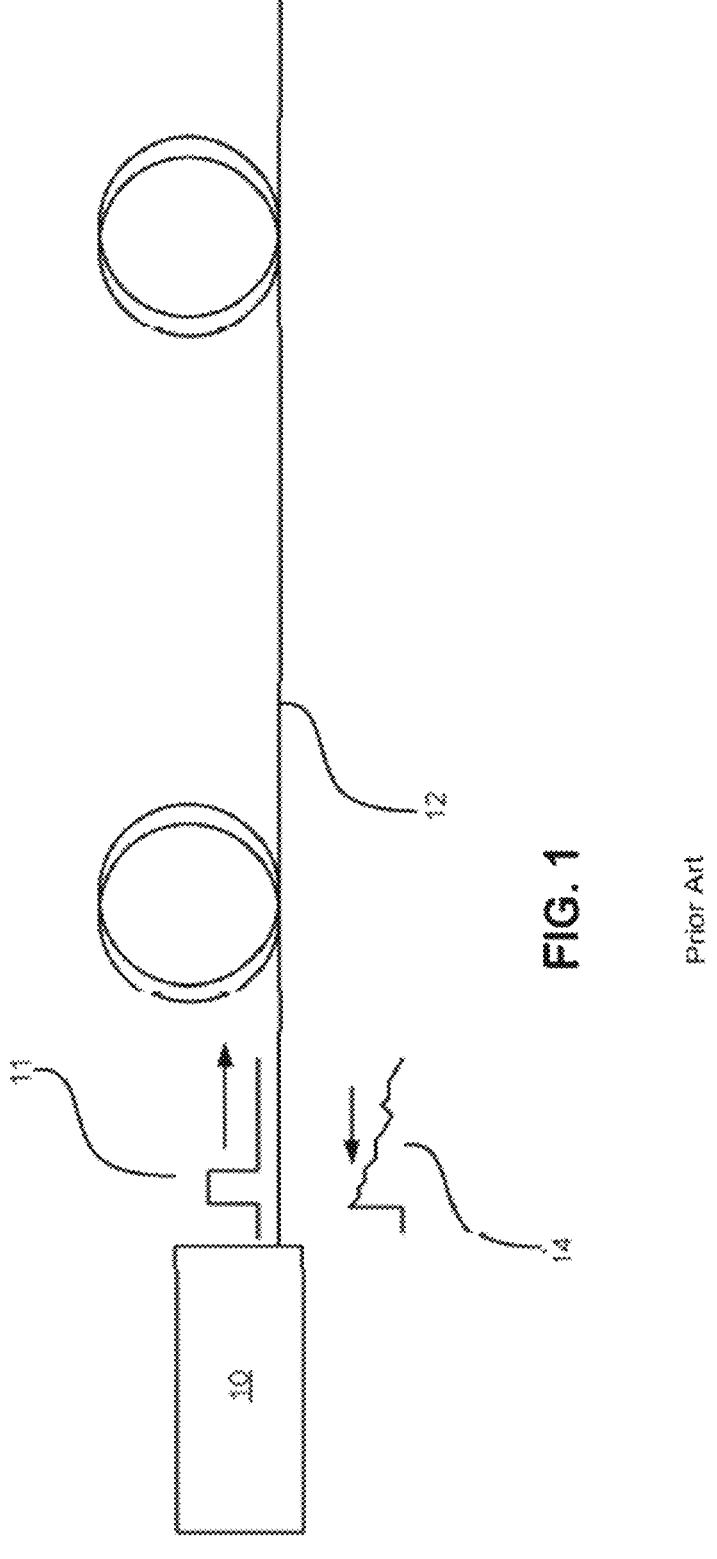
FIGS. 1 and 2 show schematic diagrams of optical sensing systems.
Figure 2:
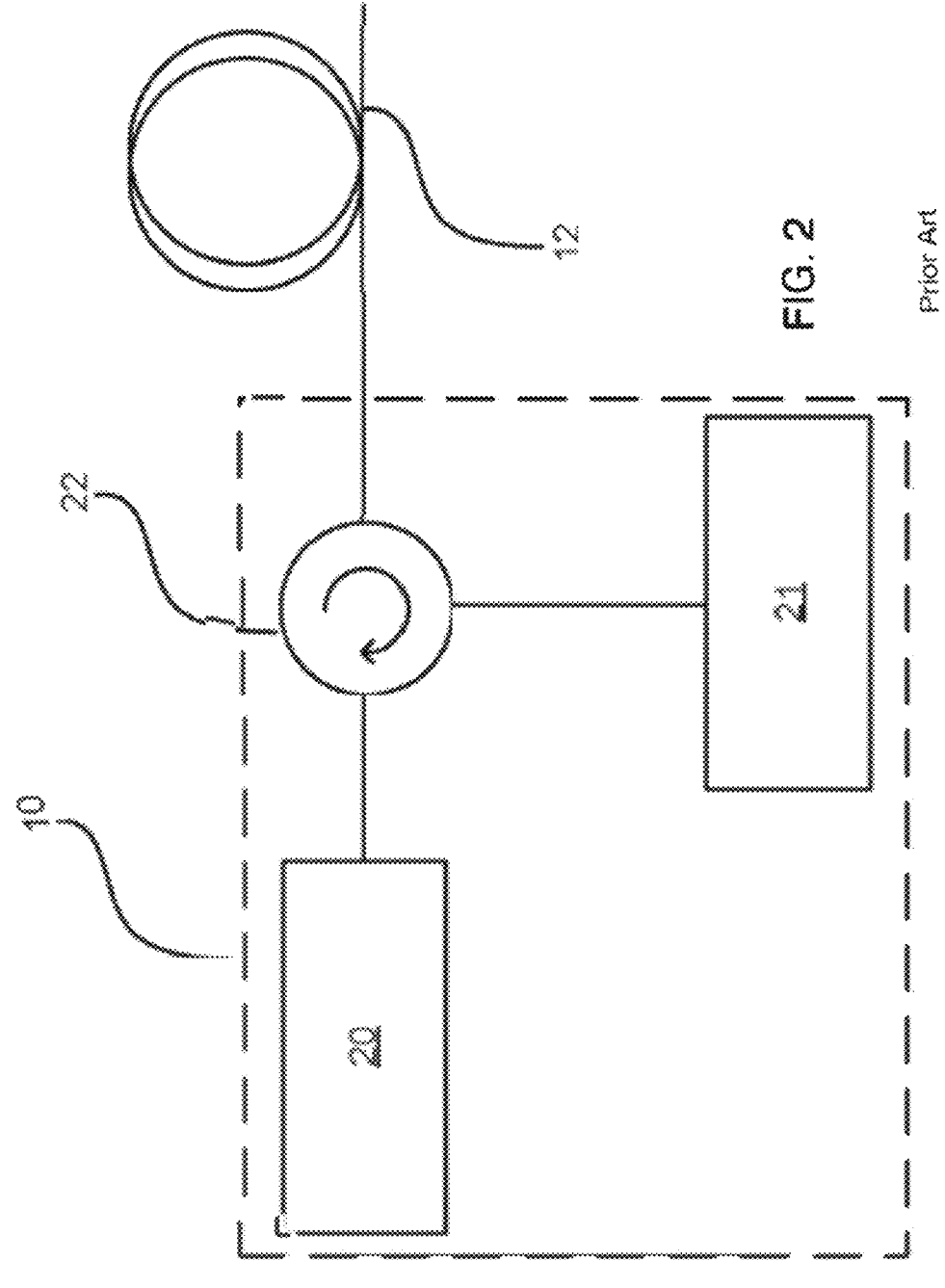

Further details, aspects and embodiments of the invention will now be described, by way of example only, with reference to the drawings. Elements in the figures are illustrated for simplicity and clarity and have not necessarily been drawn to scale. Like reference numerals have been included in the respective drawings to ease understanding.

Optical sensors allow changes to the properties of an optical fibre to be determined. As noted above distributed sensors allow such determination on a continuous basis along the fibre (subject to the resolution of the system) without required predetermined discrete sensor position. Commonly optical sensors are used to infer the strain in an optical fibre. The strain on a fibre is an indicator of the mechanical environment around the fibre and hence can be used to infer movement of a fibre or forces applied to it. If an optical sensing system has a frequency response down to DC the static strain can be determined in addition to changes in the strain.

Figure 3:
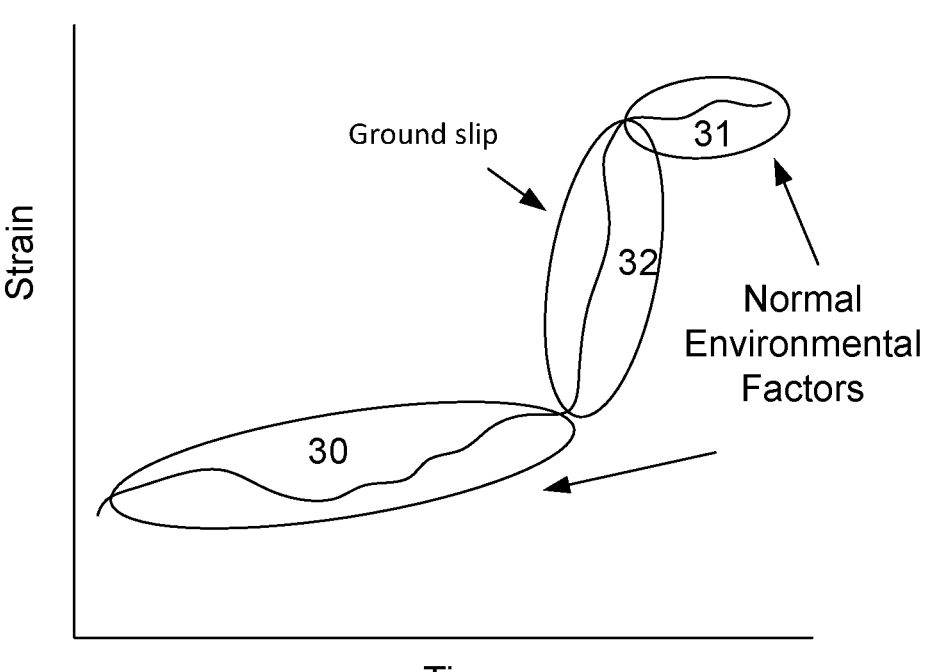
FIG. 3 shows a chart of strain vs time for a ground monitoring system.

Detection of strain changes may be used to detect movement of the sensing fibre, for example a sensing fibre may be laid on or in an area of land in order to detect landslips. FIG. 3 shows the strain in the fibre (at a chosen location) over time. In regions 30 and 31 only relatively small changes in strain are seen which may be associated with small movements in the ground which occur naturally over time. In these regions the strain is essentially static. However, in the region 32 there is a large change over a relatively short time period indicative of a landslip causing movement of the sensing fibre and hence a change in strain. The actual movement can be detected during the change in region 32 with the gradient indicative of the speed of movement. The offset between regions 30 and 31 indicates a change in static strain before and after the movement suggesting a change in position of the fibre and hence ground around the fibre. The static change can be inferred from the dynamic change or detected directly if the sensing system can sense to very low frequencies or can sense static strain (DC) (either absolute or relative to a reference).

In this disclosure the term "ground" is used to refer to the environment surrounding the sensing fibres. This may be the actual ground, but may also include any material or structure on/in which the sensing fibre is mounted or mechanically related to. For example, in the context of a sensing fibre along a train track, ground may include the ballast, rails, sleepers, and track clips all of which may move and have an associated stability value. In the context of a road, the ground may be surrounding ground, foundations, and/or tarmac or road surface. In general therefore "ground" includes any aspect of which the sensing fibre can detect movement in response to an active source.

An example of an optical sensing system is described in patent application publication WO2018/134137 which sets out a Rayleigh-backscatter based system with a bandwidth down to DC and a suitable resolution.

In an example deployment of an optical sensor the sensing fibre may be laid alongside a train track. For example, the sensing fibre may be positioned in or on the ballast supporting the tracks, or in associated cable conduits or channels. When mounted in such a position the sensing system can be used to detect a range of parameters relating to the mechanical environment of the sensor. During steady-state the sensor can be used to detect general environmental movement of the sensor by detecting strain changes, which are likely to be small and over a relatively long period of time. When a train passes along the track the sensor can be used to detect higher frequency changes in the strain of the fibre, caused by vibration of the track and surrounding materials by the train. Those higher frequency changes move along the track with the train and hence can be used to monitor movement of the train along the track and to determine the position of the train at a point in time.

It has also now been discovered that the higher frequency changes may be associated with a change in the static strain before and after passage of a train. That is, there may be an offset in the static strain before and after a train has passed, suggesting movement of the ground caused by the train. This change in static strain may be used to identify movement of the ground caused by trains, potentially indicating instability in the ground requiring attention.

Figure 4:
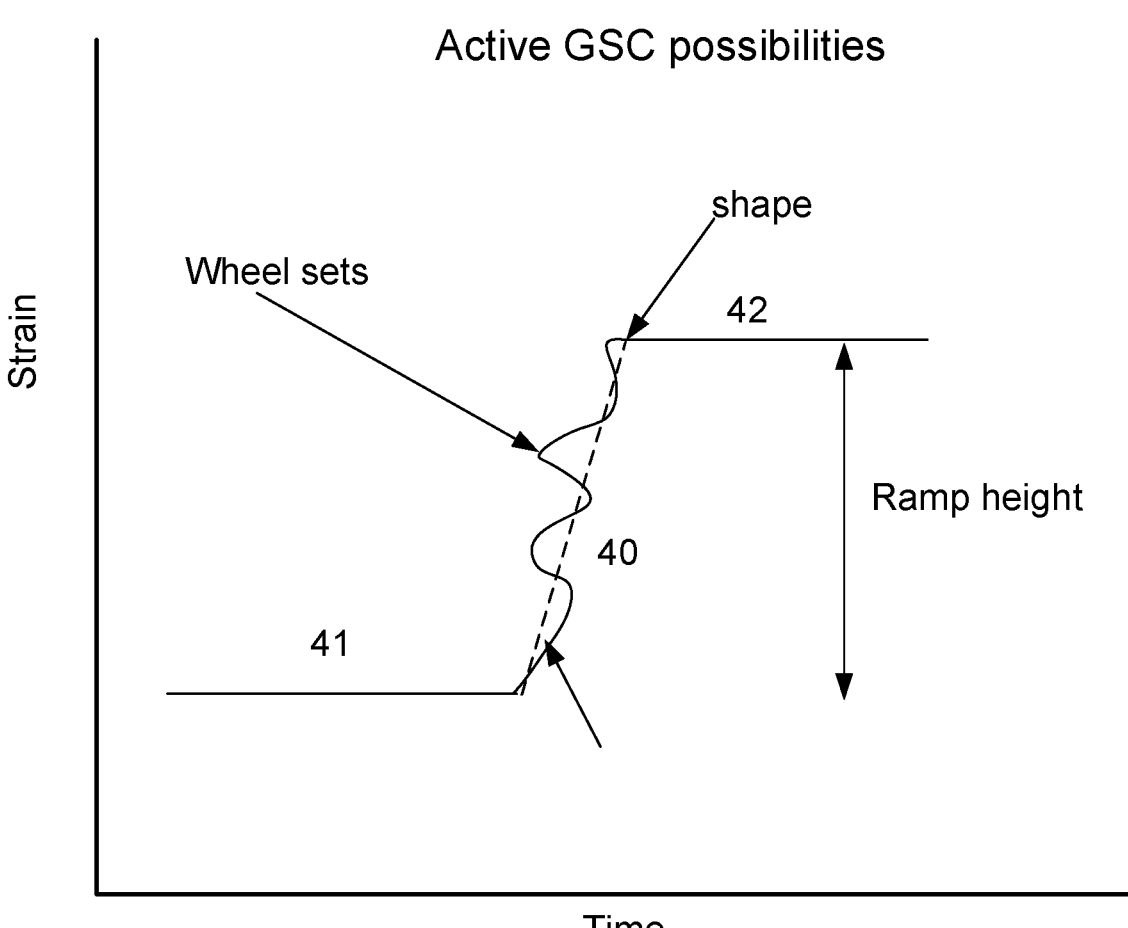
FIG. 4 shows a chart of strain vs time for an active source.

FIG. 4 shows an example plot of strain at a location along the sensor fibre against time during the passage of a train along tracks associated with a sensor. In this example the train forms an active source which is detected by the sensor in region 40 as higher frequency variations in strain and a general change in strain. The static strains before 41 and after 42 are the before and after values for the static strain which provide the change in static strain due to passage of the train. That change in static strain may indicate movement of the environment (i.e. the track bed or environment in which the sensor is mounted) caused by the train passing.

FIG. 4 shows high frequency variations in strain as the train passes. The magnitude and form of these variations provides information on dynamic ground movement, and may also provide information on the active source; for example it may indicate how may wheel sets the train has and hence the type of train can be determined. Larger, higher frequency, changes may indicate less stable ground, even if there is low static change after a train has passed. An increase over a series of sensing events (for example a series of trains) in the magnitude of higher frequency movements may indicate changes in the ground, or degradation, over time. The gradient of the strain change between the static values while the train passes may also provide information about the stability of the ground.

In the above examples, correlation with information about the active source may increase the information that can be determined. For example, if the weight or relative weight of the train is known, or can be determined, the magnitude of strain changes can be normalised to weight as it would be expected that a heavier train would create more movement.

Figure 5:
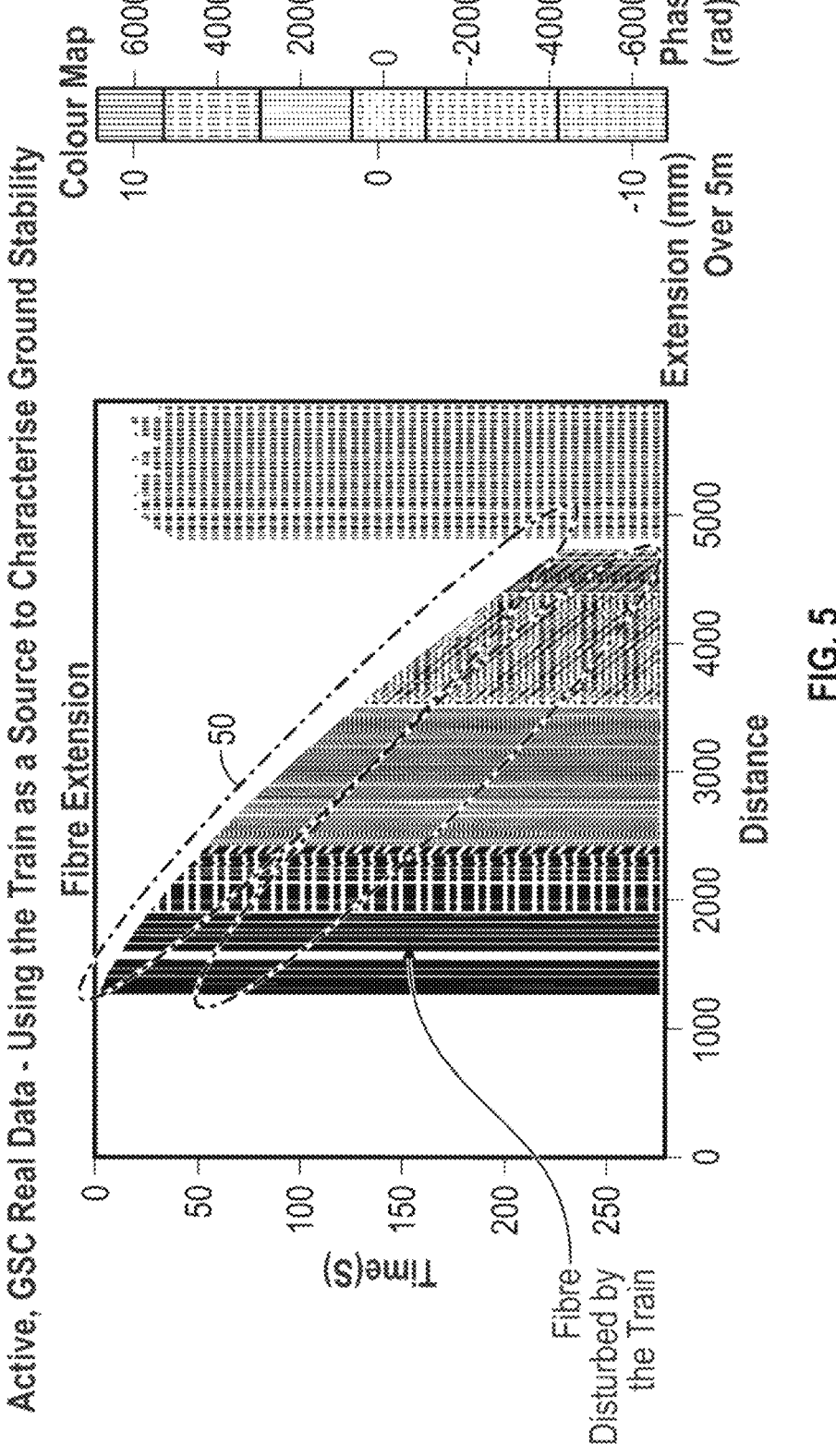
FIG. 5 shows a chart of strain for over time.

FIG. 5 shows an example of measurements taken by a distributed sensor associated with a train track before, during, and after the passage of a train. The colour scale shows changes in strain compared to the train at time=0. The vertical axis shows time, and the horizontal axis shows distance. The train starts at approximately 1250 m at t=0 and moves to higher distance values as time increases.

Changes in strain at a specific location along the track are indicated by changes in colour along a vertical line down the chart, from top to bottom. The strain from each sensor location (distance along the sensor) is normalised to zero (white in FIG. 6) at time t=0. The arrival of the train at each point along the track is indicated by the top of the coloured bars (indicated by oval 50). If there was no change in static strain after passage of the train one would expect a dark colour while the train passed, and then a return to white below it. There would thus be a diagonal line following the tops of the visible columns in FIG. 5. However, as can be seen the change in strain persists at times after the train has passed indicating long-term disturbance of the ground by the train passing. These long-term changes are equivalent to the offset/ramp height described with reference to FIG. 4.

Figure 6:
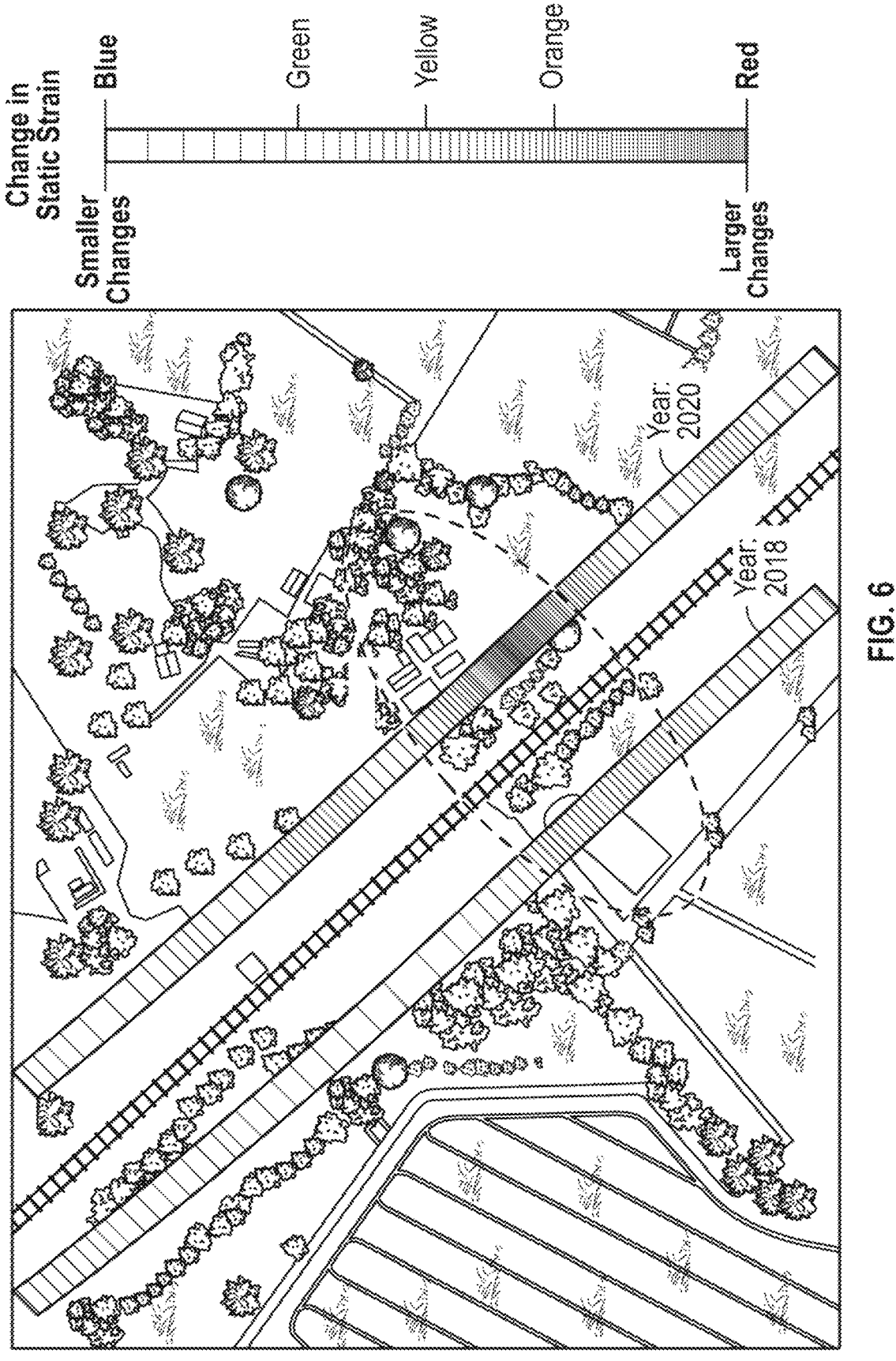
FIG. 6 shows a diagram of strain along a sensor.

Darker regions indicate greater movement of the ground. It can therefore be determined that there is greater static movement caused by each train in the region around 2000 m than the region around 4000 m which may indicate the ground is less stable in the 2000 m area. In addition, the red lines near 2500 m, for example, indicates a static contraction of the fibre. It can be concluded therefore that the train causes static elongation of the fibre in some areas and static contraction in other areas. Monitoring this data for a series of trains (likely over extended time-periods such as months or years) can be used to indicate long-term trends in ground stability as shown in FIG. 6. Equally a significant change over a smaller number of active sensing events (trains passing) may indicate a rapid change in ground conditions which may also be noteworthy.

FIG. 6 shows a plot of change in static strain when a train passes each point (ramp height in FIG. 5). Blue indicates smaller changes and red indicates larger changes. The data is for a distributed sensor associated with train tracks running between the two plotted lines. The lines are aligned along the length of the track to correlate to track position, but offset transverse to the track for ease of viewing. In the circled area there was a relatively smaller amount of movement in 2018 and a larger amount of movement in 2020 (i.e. the ramp height increased between 2018 and 2020) indicating a decrease in ground stability. This decrease was confirmed by a site visit which revealed the need for repair of the track support aggregate. The disclosed systems are thus confirmed to provide an indication of ground stability by correlating changes in static strain to an active source event (in this case a train passing the location).

The data therefore shows that the train is acting as an active source to probe the surrounding ground such that changes by that probing are detected by the sensor to provide an indication of ground stability. The sensor system measures the longitudinal strain present in the fibre, which is typically induced due to lateral deflection of the environment around the optical fibre. However, changes in stain over time cannot be summed to give a total movement because each deflection can be in a different direction, which direction cannot be determined from the strain measurements. The strain is therefore an indicator of ground stability, not a measure of absolute ground movement.

Passive measurements of the ground may not provide an indication of ground stability due to cross-sensitivity to other parameters. For example, changes in temperature may affect the strain measurements. Furthermore, a decrease in ground stability may not lead directly to movement in the ground and may therefore not be sensed by a passive sensor. It may only be when the ground is probed by an active source, such as a train, that the reduction in stability leads to actual ground movement. The short period of the active source means changes in other parameters which may affect the static strain measurement are expected to be negligible. The disclosed system thus allows measurement of a parameter that cannot be detected by a passive sensor.

In addition to ground stability, the ramp height may also be affected by other parameters, particularly those of the active source. For example, it can be expected that a heavier or larger train would lead to greater movement of the ground and hence greater strain changes. Normalising the ramp height based on train size or weight would remove such dependency and hence improve the ability to compare different active source events to determine ground stability.

The high frequency variations in strain which occur as a train passes may be used to infer information about the weight or size of the train for use in normalising the ramp height. For example, the number of wheelsets of a train may be determined from the number of oscillations in strain at a fixed location. As a general indication static changes are those at a frequency of <0.2 Hz, and dynamic or higher frequency changes are those with a frequency of >0.2 Hz. The number, spacing and relative strength of wheelset signals can be correlated to train composition and type and hence to estimated weight. The amplitude of the high frequency changes may also be indicative of train weight. Determination of an absolute weight may not be required, as relative weight between trains may be simpler to determine. The relative weight allows successive ramp heights to be normalised such that variations can be attributed to changes in ground stability rather than a larger probe (train weight).

Figure 7:
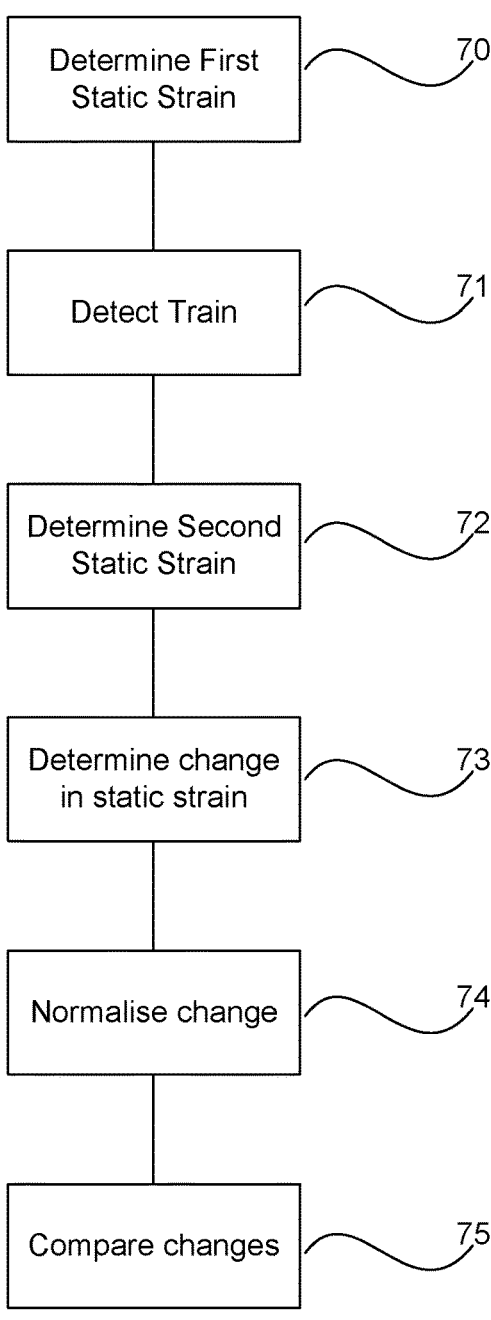
FIG. 7 shows a flow chart of a method of determining ground stability.

FIG. 7 shows an example method for determining ground stability. The method is for application utilising a distributed sensor positioned to detect changes in strain due to ground movement along the length of a train track. At step 70 the static strain at a point of interest along the length of the area of interest is determined. At step 71 the passage of a train past a point of interest is detected by the presence of higher frequency variations in the detected strain. At step 72 passage of the train past the point of interest is complete and the static strain at the point of interest is determined. At step 73 the change in static strain between steps 70 and 72, caused by the passage of the train, is determined. At step 74 the change in static strain is normalised based on the relative weight of the train, which may be determined from the higher frequency variations at step 71. At step 75 a plurality of normalised changes in static strain at the point of interest are compared to determine a change in ground stability over time. The method of FIG. 7 thus allows changes in ground stability over time to be determined.

Data from a plurality of distances (sensors/channels) may be accumulated and processed as a set to provide further information. For example, an average may be taken over a set of static strains to determine the overall movement of a region. Alternating positive and negative strains may sum or average to approximately zero which may indicated there is no overall problem with ground stability in that region, even though individual measurements may be high. Furthermore, newly laid sensing fibre may initially relax into its physical environmental, indicated by a net contraction over time. Data processing may be used to compensate for this change which is not caused by changes in ground stability.

In the method of FIG. 7 the passage of train may be determined by any appropriate method, which may not utilise the high frequency strain changes mentioned at step 71. Similarly, the relative weight of the train may be determined by any appropriate means, or the static change may not be normalised by relative weight. Weight is used herein as an example parameter for normalising the change in static strain, but any parameter indicative of the strength of the active source may be utilised, depending on the nature of the active source. Other examples could be kinetic energy (proportional to the square of velocity) or the impulse (mass times change in velocity over a particular time interval) if the train is accelerating or decelerating.

As will be apparent the method of FIG. 7 can be applied at a plurality of points along the length of the sensor to form a measure of ground stability along that length, such as the data shown in FIG. 6. The resolution of the data will be determined by the resolution provided by the sensor system when detecting static strain.

The above disclosure has been given primarily with reference to ground movement in relation to train tracks and utilising trains as an active source. However, the principle of using an active source with a distributed sensor to detect changes in ground stability can be utilised in a range of other environments. For example, sensors may be laid along a road or runway and vehicles may provide the active source. As with the train example, changes in static strain before/ after passage of a vehicle can be used to monitor ground stability over time. The disclosure contemplates the use of any active source which disturbs the ground to produce a change in static strain. Other examples include temperate changes or tidal movements.

The above description has been given primarily with reference to purely distributed sensors. However, the techniques and apparatus may also be applied to systems with reflectors to produce specific return signals at defined locations along a fibre. This may be desirable to increase the sensitivity of the measurement fibre at defined locations along the measurement fibre.

As will be appreciated the methods described herein may be performed by the interrogator unit as described hereinbefore. The interrogator unit may be implemented in hardware or hardware and software as appropriate.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality. In the claims, the term 'comprising' or "including" does not exclude the presence of other elements.

The invention claimed is:

1. A method of determining ground stability utilizing a distributed optical sensor, the method comprising:

transmitting, along an optical fibre, optical signals, wherein the optical signals are transmitted as outbound pulses and returned as returning pulses along the optical fibre;

determining, via an interrogator device coupled to the distributed optical sensor, a first static strain at at least one location along a length of the distributed optical sensor;

detecting, via processing of the returning pulse by the interrogator device, variation in strain at the at least one location caused by an active source which is a moving vehicle travelling along a route with which the optical fibre is associated, such that variation in strain generated by the vehicle can be detected by the distributed optical sensor;

determining a second static strain at the at least one location after the variation in strain caused by the active source has ended; and determining a difference between the first static strain and the second static strain.

2. A method according to claim 1 wherein the detection of variation in strain is performed by detecting higher frequency variations in strain at the location.

3. A method according to claim 1 wherein a relative strength of the active source is determined based on higher frequency variations in strain.

4. A method according to claim 1, further comprising normalizing the difference between first and second static strains based on strength of the active source.

5. A method according to claim 1, further comprising determining an indication of ground stability at the location based on the difference between first and second strains.

6. A method according to claim 5, wherein the indication of ground stability is also based on a plurality of differences between the first and second strains.

7. A method according to claim 1 wherein the active source is a train and the distributed optical sensor is associated with train tracks on which the train runs.

8. A method according to claim 1, further comprising performing the method at a plurality of locations along the length of the distributed optical sensor.

9. A method according to claim 8, wherein the method further comprises:

sampling the returning pulse at particular times to determine backscatter from particular locations of the plurality of locations along a length of the distributed optical sensor; and averaging measurements from the plurality of locations.

10. An optical sensing system for determining ground stability along a route that an active source travels, the system comprising:

a distributed optical sensor;

an optical fibre of the distributed optical sensor, the optical fibre mounted in ground along the route that the active source travels; and an interrogator optically connected to the optical fibre and configured to transmit an optical signal into the optical fibre as an outbound pulse and to detect returning optical signals output from the optical fibre, the returning optical signals being backscatter from the output pulse, wherein the interrogator is configured to:

determine a first static strain at at least one location along a length of the distributed optical sensor based on the returning optical signals;

detect, via sampling of the returning pulse at particular times to determine backscatter from particular locations of the plurality of locations along a length of the distributed optical sensor, variation in strain at the at least one location by measuring the backscatter that results from physical disturbance of the optical fibre caused by travel of the active source along the route;

determine a second static strain at the at least one location after the variation in strain caused by presence of the active source has ended; and determine a difference between the first static strain and the second static strain.

11. The method according to claim 2, wherein the relative strength of the active source is determined based on higher frequency variations in strain.

12. The method according to claim 11, further comprising normalizing the difference between first and second static strains based on strength of the active source.

13. The method according to claim 12, further comprising determining an indication of ground stability at the location based on the difference between first and second strains.

14. The method according to claim 13, wherein the indication of ground stability is also based on a plurality of differences between first and second strains.

15. The method according to claim 13, wherein the active source is a train and the distributed optical sensor is associated with train tracks on which the train runs.

16. The method according to claim 15, wherein the indication of ground stability is also based on a plurality of differences between first and second strains.

17. The method according to claim 15, further comprising performing the method at a plurality of locations along the length of the distributed optical sensor.

18. The method according to claim 17, wherein the indication of ground stability is also based on a plurality of differences between first and second strains.

19. The method according to claim 17, wherein the method comprises averaging measurements from the plurality of locations.

20. The method according to claim 19, wherein the indication of ground stability is also based on a plurality of differences between first and second strains.

\* \* \* \* \*